US009955460B2

(12) United States Patent
Tavildar et al.

(10) Patent No.: US 9,955,460 B2
(45) Date of Patent: Apr. 24, 2018

(54) SCHEDULING ASSIGNMENT OPTIMIZATION FOR DEVICE-TO-DEVICE COMMUNICATIONS

(71) Applicant: QUALCOMM Incorporated, San Diego, CA (US)

(72) Inventors: Saurabha Rangrao Tavildar, Jersey City, NJ (US); Shailesh Patil, Raritan, NJ (US); Kapil Gulati, Franklin Park, NJ (US); Sudhir Kumar Baghel, Bridgewater, NJ (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 15/159,756

(22) Filed: May 19, 2016

(65) Prior Publication Data

US 2017/0006583 A1    Jan. 5, 2017

Related U.S. Application Data

(60) Provisional application No. 62/187,745, filed on Jul. 1, 2015.

(51) Int. Cl.
*H04W 72/04*      (2009.01)
*H04L 5/00*       (2006.01)
(Continued)

(52) U.S. Cl.
CPC .......... *H04W 72/04* (2013.01); *H04B 7/2615* (2013.01); *H04L 5/0044* (2013.01);
(Continued)

(58) Field of Classification Search
CPC ...................................... H04W 72/04
(Continued)

(56) References Cited

U.S. PATENT DOCUMENTS 5,629,948 A * 5/1997 Hagiwara ............. H04L 1/1812
714/748
2014/0016574 A1 * 1/2014 Seo .................... H04W 76/023
370/329
(Continued)

FOREIGN PATENT DOCUMENTS

WO    2014129848 A1    8/2014
WO    2014142576 A1    9/2014

OTHER PUBLICATIONS

International Search Report and Written Opinion—PCT/US2016/033634—ISA/EPO—Oct. 4, 2016.
(Continued)

*Primary Examiner* — Vladimir Magloire
*Assistant Examiner* — Frank Donado
(74) *Attorney, Agent, or Firm* — Arent Fox LLP and Qualcomm Incorporated

(57) ABSTRACT

In one aspect of this disclosure, control information and data are carried in the same subframe in order to reduce control overhead. A method, an apparatus, and a computer-readable medium for wireless communication are provided. The apparatus may be a first UE. The first UE determines a data block to be transmitted to a second UE. The first UE determines a first resource in a subframe for carrying the data block and determines a second resource in the subframe for carrying control information associated with transmitting the data block. The first UE transmits the data block and the control information to the second UE in a device-to-device communication channel on the determined first and second resources, respectively.

24 Claims, 10 Drawing Sheets

(51) Int. Cl.
*H04B 7/26* (2006.01)
*H04W 4/00* (2018.01)
*H04W 72/12* (2009.01)
*H04W 88/02* (2009.01)

(52) U.S. Cl.
CPC .......... *H04L 5/0053* (2013.01); *H04W 4/005* (2013.01); *H04W 72/12* (2013.01); *H04W 88/02* (2013.01)

(58) Field of Classification Search
USPC ........................................................ 455/450
See application file for complete search history.

(56) References Cited

U.S. PATENT DOCUMENTS

| | | | | |
|---|---|---|---|---|
| 2014/0204898 A1* | 7/2014 | Yang | ...................... | H04W 8/005 370/330 |
| 2015/0230284 A1* | 8/2015 | Nimbalker | .......... | H04W 72/048 455/450 |
| 2015/0358964 A1* | 12/2015 | Tiirola | ................. | H04B 7/2656 370/280 |
| 2016/0007374 A1* | 1/2016 | Lee | .......................... | H04J 11/00 370/336 |
| 2016/0029331 A1* | 1/2016 | Seo | ..................... | H04W 56/002 370/350 |
| 2016/0338095 A1* | 11/2016 | Faurie | ............... | H04W 28/0278 |
| 2017/0013580 A1* | 1/2017 | Kim | ..................... | H04W 56/00 |

OTHER PUBLICATIONS

Catt: "Discussion on Physical Channel Types for D2D Communication", 3GPP Draft; R1-135092, 3rd Generation Partnership Project (3GPP), Mobile Competence Centre; 650, Route Des Lucjoles; F-06921 Sophia-Antipolis Cedex; France vol. RAN WG1, No. San Francisco, USA; Nov. 11, 2013-Nov. 15, 2013, Nov. 13, 2013 (Nov. 13, 2013), XP050734795, Retrieved from the Internet: URL:http://www.3gpp.org/ftp/Meetings_3GPP_ SYNC/RAN/RAN1/Docs/ [retrieved on Nov. 13, 2013].
Ericsson: "Work Item Proposal for Enhanced LTE Device to Device Proximity Services", 3GPP Draft; RP-142027, 3rd Generation Partnership Project (3GPP), Mobile Competence Centre; 650, Route Des Lucioles ; F-06921 Sophia-Antipolis Cedex; France vol. TSG RAN, No. Maui, USA; Dec. 8, 2014-Dec. 11, 2014, Dec. 2, 2014 (Dec. 2, 2014), XP050898707, Retrieved from the Internet: URL:http://www.3gpp.org/ftp/Meetings_3GPP_SYNC/RAN/Docs/ [retrieved on Dec. 2, 2014].
Partial International Search Report—PCT/US2016/033634—ISA/EPO—Aug. 10, 2016.
ZTE: "Study on D2D Resource Allocation for Out of Network Coverage Scenario", 3GPP Draft; R1-140271 D2D COMM Resource Allocation, 3rd Generation Partnership Project (3GPP), Mobile Competence Centre; 650, Route Des Lucioles; F-06921 Sophia-Antipolis Ceoex; France vol. RAN WG1, No. Prague, Czech Republic; Feb. 10, 2014-Feb. 14, 2014, Feb. 9, 2014 (Feb. 9, 2014), XP050735821, Retrieved from the Internet: URL:http://www.3gpp.org;ftp/Meetings_3GPP_SYNC/RAN/RAN1/Docs/ [retrieved on Feb. 9, 2014].

* cited by examiner

SCHEDULING ASSIGNMENT OPTIMIZATION FOR DEVICE-TO-DEVICE COMMUNICATIONS

CROSS-REFERENCE TO RELATED APPLICATION

This application claims the benefit of U.S. Provisional Application Ser. No. 62/187,745, entitled "SCHEDULING ASSIGNMENT OPTIMIZATION FOR DEVICE-TO-DEVICE COMMUNICATIONS" and filed on Jul. 1, 2015, which is expressly incorporated by reference herein in its entirety.

BACKGROUND

Field

The present disclosure relates generally to communication systems, and more particularly, to scheduling assignment for device-to-device communications systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In a traditional device-to-device communication system, when a UE communicates with another UE in device-to-device communication, data to be transmitted and the control information for transmitting the data are carried in separate subframes. Because control information and data are carried in separate subframes, the overhead for transmitting control information can be burdensome.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a traditional device-to-device communication system, when a UE communicates with another UE in device-to-device communication, data to be transmitted and the control information for transmitting the data are carried in separate subframes. Thus, the overhead for transmitting control information can be burdensome. In one configuration of this disclosure, control information and data are carried in the same subframe in order to reduce control overhead.

In an aspect of the disclosure, a method, a computer-readable medium, and an apparatus for wireless communication are provided. The apparatus may be a first UE. The first UE determines a data block to be transmitted to a second UE. The first UE determines a first resource in a subframe for carrying the data block and determines a second resource in the subframe for carrying control information associated with transmitting the data block. The first UE transmits the data block and the control information to the second UE in a device-to-device communication channel on the determined first and second resources, respectively.

In one configuration, the data block and the control information may be transmitted to the second UE through a vehicle communication broadcast message. In one configuration, the device-to-device communication channel may employ an LTE Direct protocol. In one configuration, the second resource may include at least a portion of a fixed control symbol within the subframe. The control symbol may include several resource elements. The second resource may include a fixed number of resource elements of the control symbol. In one configuration, no data is multiplexed within the control symbol. In one configuration, the control information may include an allocation of the first resource.

In one configuration, the control symbol may be adjacent to a DM-RS symbol, which may use a fixed reference signal that has fixed base sequence, cyclic shift, and OCC. A DM-RS symbol not adjacent to the control symbol may use a reference signal with parameters dependent on the control information.

In one configuration, the control information may include one or more of a number of transmissions of the data block, a RVID of current data transmission, a MCS of the data block, a TRPT, or frequency information of subsequent re-transmissions. The control information may include an incremental scheduling of a next re-transmission of the data block instead of the TRPT. In one configuration, the control information may be present only in a first transmission of the data block and subsequent re-transmissions of the data block do not carry the control information.

In another aspect of the disclosure, a method, a computer-readable medium, and an apparatus for wireless communication are provided. The apparatus may be a first UE. The first UE receives a device-to-device communication channel from a second UE with one or more data resources in a subframe carrying a data block and a predetermined control resource in the subframe carrying control information for transmitting the data block. The first UE decodes the control information from the predetermined control resource in the subframe. The first UE retrieves the data block from the one or more data resources in the subframe based on the decoded control information.

In one configuration, the data block and the control information may be received through a vehicle communication broadcast message. In one configuration, the device-to-device communication channel may employ an LTE Direct protocol.

In one configuration, the predetermined control resource may include at least a portion of a fixed control symbol within the subframe. To decode the control information, the first UE may retrieve the control information from the fixed control symbol. In one configuration, the control symbol may include several resource elements, and the predetermined control resource may include a fixed number of resource elements from the several resource elements. In one configuration, the control information may include an allocation of the one or more data resources that carry the data block. In one configuration, the allocation may include the size and start of the one or more data resources. In another configuration, the allocation may include the size of the one or more data resources, and the start of the one or more data resources may be determined based on the start of the control symbol or the size of the one or more data resources.

In one configuration, the control symbol may be adjacent to a DM-RS symbol. In one configuration, the DM-RS symbol may use a fixed reference signal that has fixed base sequence, cyclic shift, and OCC. In one configuration, a DM-RS symbol not adjacent to the control symbol may use a reference signal with parameters dependent on the control information.

In one configuration, the control information may include one or more of: the number of transmissions of the data block, a RVID of current data transmission, the MCS of the data block, the TRPT, or frequency information of subsequent re-transmissions. In one configuration, the control information may include an incremental scheduling of a next re-transmission of the data block instead of the TRPT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
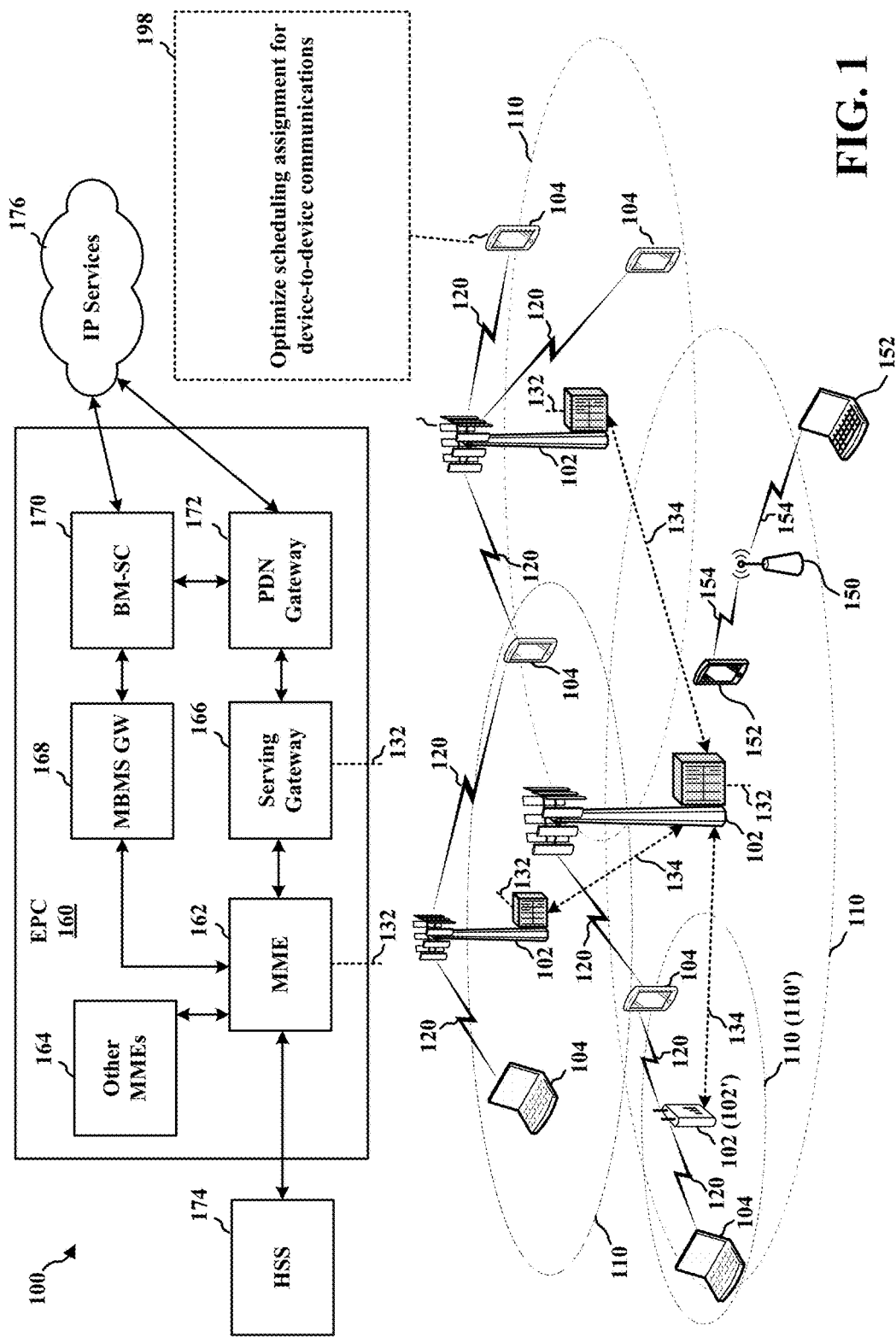
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to optimize (198) scheduling assignment for device-to-device communication. Details of the operations performed at 198 will be described further below with reference to FIGS. 5-10.

Figure 2:
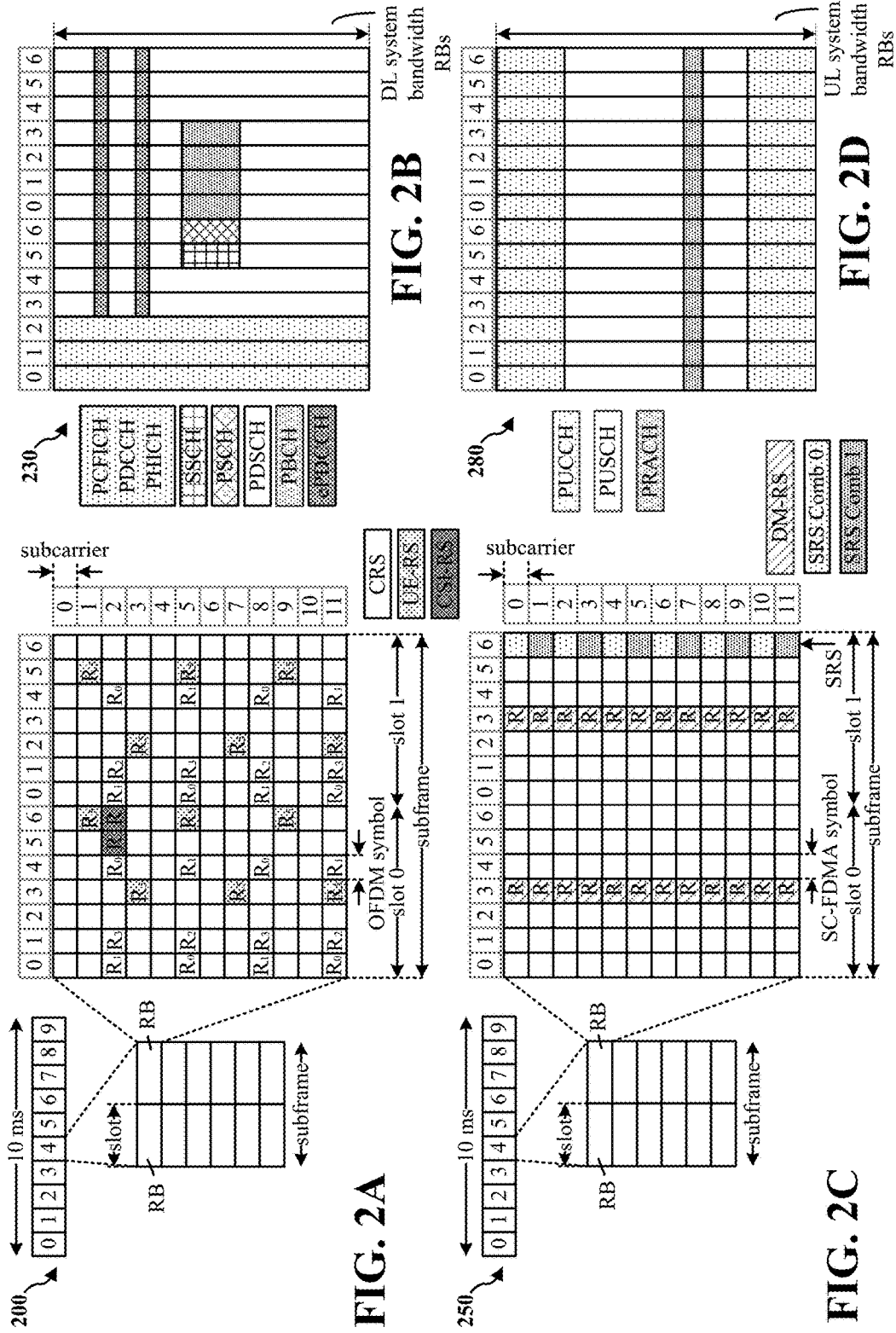
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
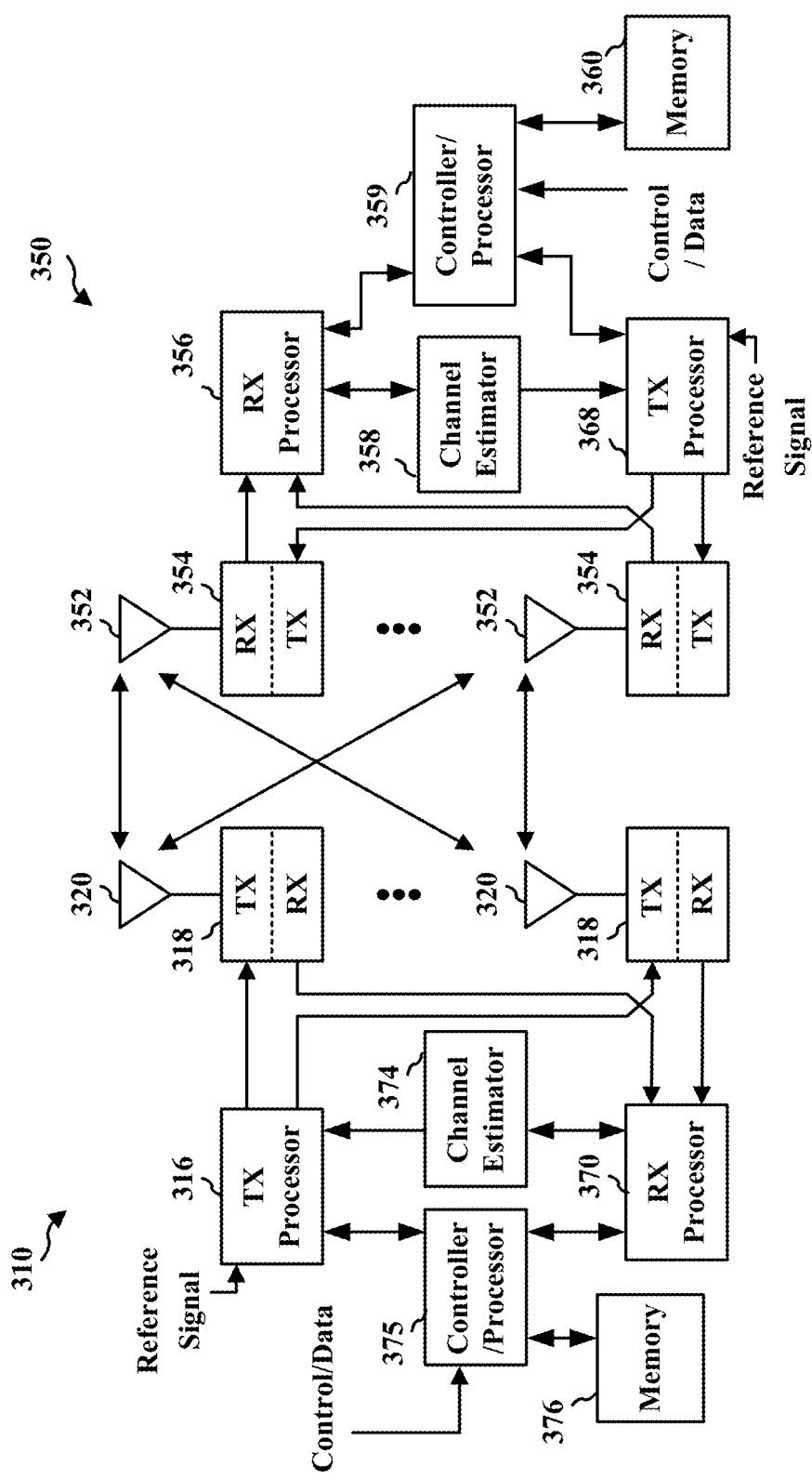
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
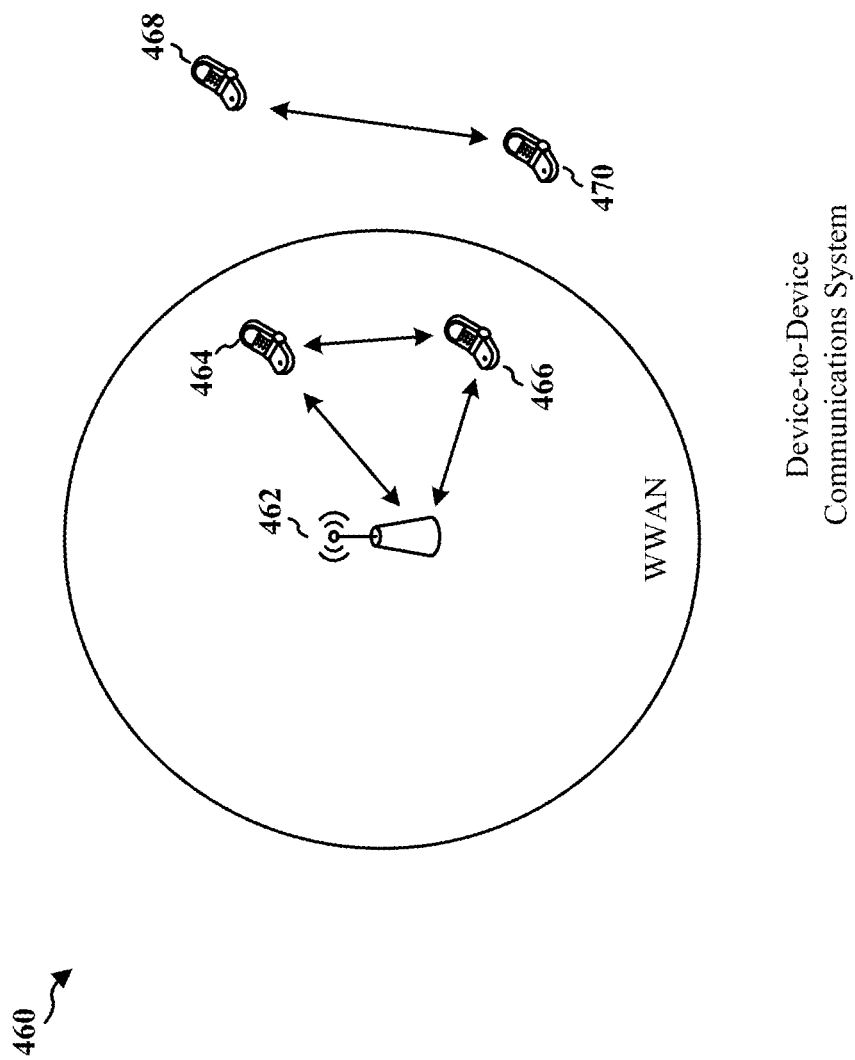
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

In one configuration, some or all of the UEs 464, 466, 468, 470 may be equipped or located on vehicles. In such a configuration, the D2D communications system 460 may also be referred to as a vehicle-to-vehicle (V2V) communications system.

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

In a traditional device-to-device communication system, when a UE communicates with another UE in device-to-device communication, data to be transmitted and the control information for transmitting the data are carried in separate subframes. For example, the sender UE may send subframes carrying control information before sending subframes carrying data. At the receiver UE, control information for transmitting the data may be decoded from the subframes carrying control information. The decoded control information may be used to retrieve data from the subframes carrying data. Because control information and data are carried in separate subframes, the overhead for transmitting control information can be burdensome.

Figure 5:
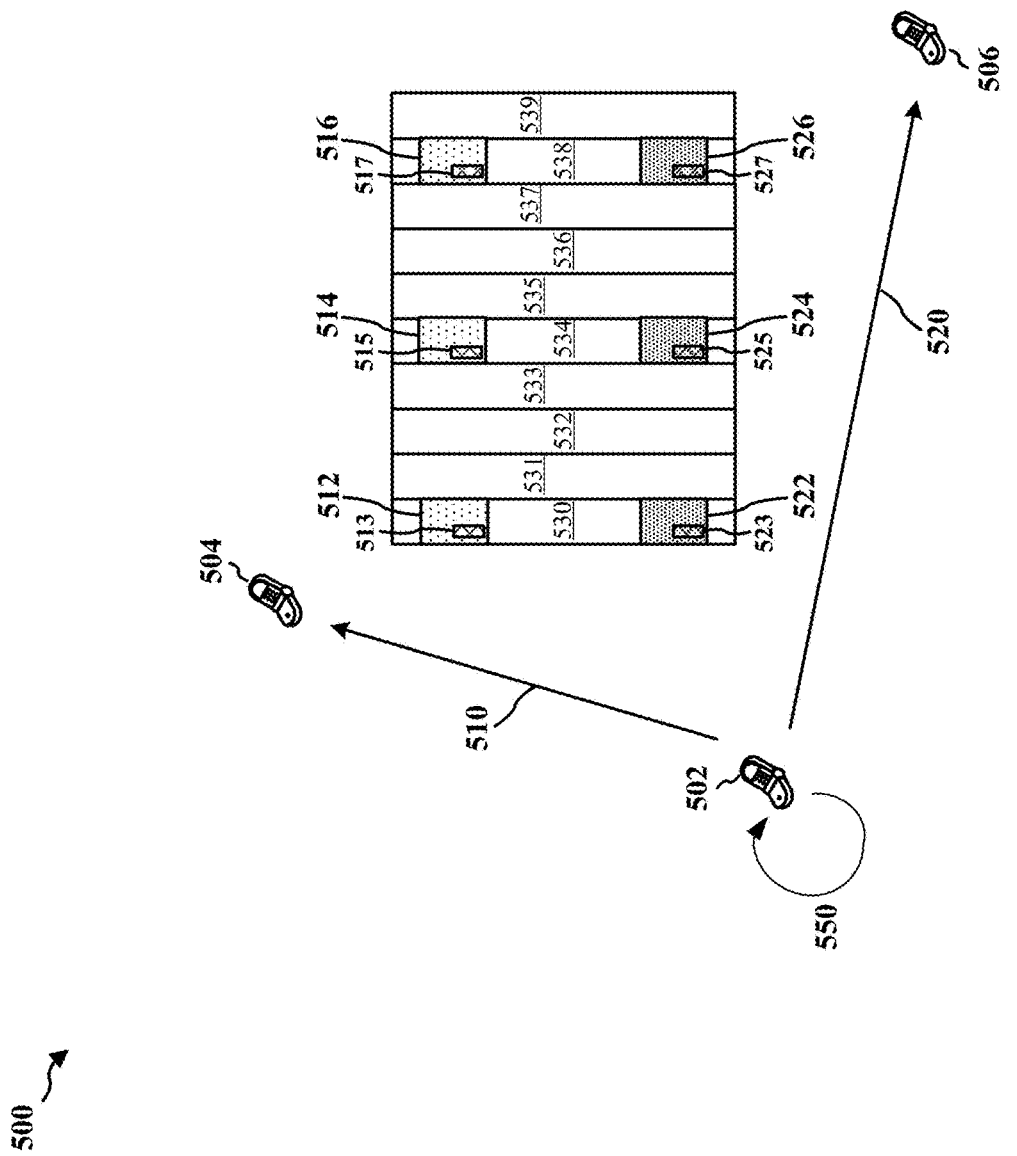
FIG. 5 is a diagram illustrating an example of carrying control information and data in the same subframe in a device-to-device communications system.

In one configuration of this disclosure, control information and data are carried in the same subframe in order to reduce control overhead. FIG. 5 is a diagram illustrating an example of carrying control information and data in the same subframe in a device-to-device communications system 500. The device-to-device communications system 500 includes UEs 502, 504, and 506. The UE 502 may communicate with the UEs 504 and 506 through device-to-device communication channels 510 and 520, respectively. In one configuration, the device-to-device communication channels 510 and 520 employ the LTE Direct protocol.

In order to transmit data to the UE 504, the UE 502 may assign (at 550) resource block 512 in subframe 530 for carrying data to the UE 504, and assign (at 550) resource block 513 in subframe 530 for carrying control information to the UE 504. The control information may include scheduling assignment related to data transmission. The scheduling assignment may include data resources assignments. For example, in one configuration, the control information carried on resource block 513 may indicate an allocation of the resource block 512. The resource blocks 512 and 513 may be adjacent to each other in subframe 530, or may not be adjacent to each other. The resource block 513 may be surrounded by the resource block 512. Similarly, the UE 502 may assign (at 550) resource blocks 514 and 516 in subframes 534 and 538, respectively, for carrying data to the UE 504, and assign (at 550) resource blocks 515 and 517 in subframes 534 and 538, respectively, for carrying control information related to transmitting data in corresponding subframes to the UE 504.

In order to transmit data to the UE 506, the UE 502 may assign (at 550) resource block 522 in subframe 530 for carrying data to the UE 506, and assign (at 550) resource block 523 in subframe 530 for carrying control information related to transmitting data in subframe 530 to the UE 506. In one configuration, the control information carried on resource block 523 may indicate an allocation of the resource block 522. Similarly, the UE 502 may assign (at 550) resource blocks 524 and 526 in subframes 534 and 538, respectively, for carrying data to the UE 506, and assign (at 550) resource blocks 525 and 527 in subframes 534 and 538, respectively, for carrying control information related to transmitting data in corresponding subframes to the UE 506.

In one configuration, the UE 502 may send control information and data to the UE 504 in subframe 530 through the device-to-device communication channel 510. The UE 504 is not aware of the resource block allocation for data transmission in subframe 530. The UE 504, however, may be aware of the resource block allocation (e.g., the resource block 513) for control information transmission in subframe 520. At the UE 504, control information for transmitting data within subframe 530 may be decoded from the resource block 513. The control information may include the resource block allocation for data transmission (e.g., the start location and size of resource block 512) in subframe 530. The decoded control information may be used to retrieve data from resource block 512 in subframe 530.

Figure 6:
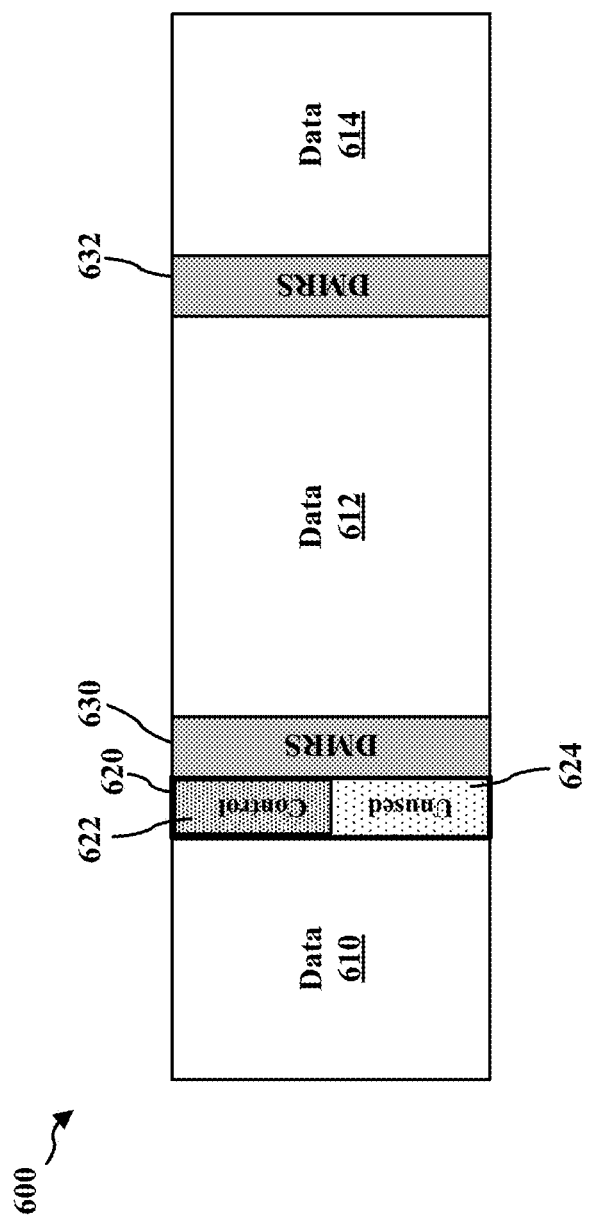
FIG. 6 is a diagram illustrating an example of a subframe that carries both data and control information in device-to-device communication.

FIG. 6 is a diagram illustrating an example of a subframe 600 that carries both data and control information in device-to-device communication. As illustrated, data is carried on resource blocks 610, 612, and 614 in subframe 600. Control information is carried on a control symbol 620 in subframe 600. In one configuration, the control symbol 620 is a fixed symbol within subframe 600. In such configuration, the receiver UE of the device-to-device communication may know which symbol in subframe 600 is used for carrying control information (e.g., the control symbol 620). The control information may use a fixed bandwidth. Thus the control information may be carried on a fixed number of resource elements 622 of the control symbol 620. For example, the control information may be carried on two resource elements of the control symbol 620. Consequently, the receiver UE may retrieve control information from the first two resource elements of the control symbol 620 and decode the retrieved control information. The remaining resource elements 624 of the control symbol 620 may be unused. No data or other information is multiplexed from the sender UE in the control symbol 620.

In one configuration, the control information carried on the control symbol 620 may indicate an allocation of the resource blocks for carrying data. For example, the control information may indicate the sizes and start locations of the resource blocks 610, 612, and 614 in subframe 600. In one configuration, the control information may only indicate the sizes of the resource blocks 610, 612, and 614. The start locations of the resource blocks 610, 612, and 614 may be determined based on the start location of the control symbol 620 and/or the sizes of the resource blocks 610, 612, and 614.

In one configuration, the control symbol 620 is adjacent to a DM-RS symbol 630. The receiver UE may use the DM-RS symbol 630 to measure signal quality of the device-to-device communication channel before retrieving and decoding the control information from the control symbol 620. The receiver UE may only retrieve and decode the control information from the control symbol 620 when the signal quality of the device-to-device communication channel exceeds a threshold quality. In one configuration, the DM-RS symbol 630 uses a fixed reference signal that has fixed base sequence, cyclic shift, and orthogonal cover code (OCC) so that the receiver UE may measure the reference signal without first obtaining the control information.

There may be another DM-RS symbol 632 in subframe 600. The DM-RS symbol 632 is not adjacent to the control symbol 620 and may use a reference signal with parameters (e.g., base sequence, cyclic shift, and OCC) dependent on the control information. Therefore, the receiver UE may obtain the control information from the control symbol 620 before processing the DM-RS symbol 632.

In one configuration, in order to make control information decodable based on any re-transmission of data, the control information may include one or more of: the number of transmissions of data, the redundancy version identifier (RVID) of current data transmission, the modulation and coding scheme (MCS) of data, the time resource pattern of transmission (TRPT), or frequency information of subsequent re-transmissions. In one configuration, the control information may include an incremental scheduling of the next re-transmission of the data instead of the TRPT. For example, the control information may signal that the next re-transmission of data is to occur in three subframes.

Because a TRPT may use 7 bits while an incremental value may only use 2-3 bits, control overhead is further reduced. In one configuration, the control information may be present only in the first transmission of a data packet and subsequent re-transmissions of the same data do not carry the control information.

Figure 7:
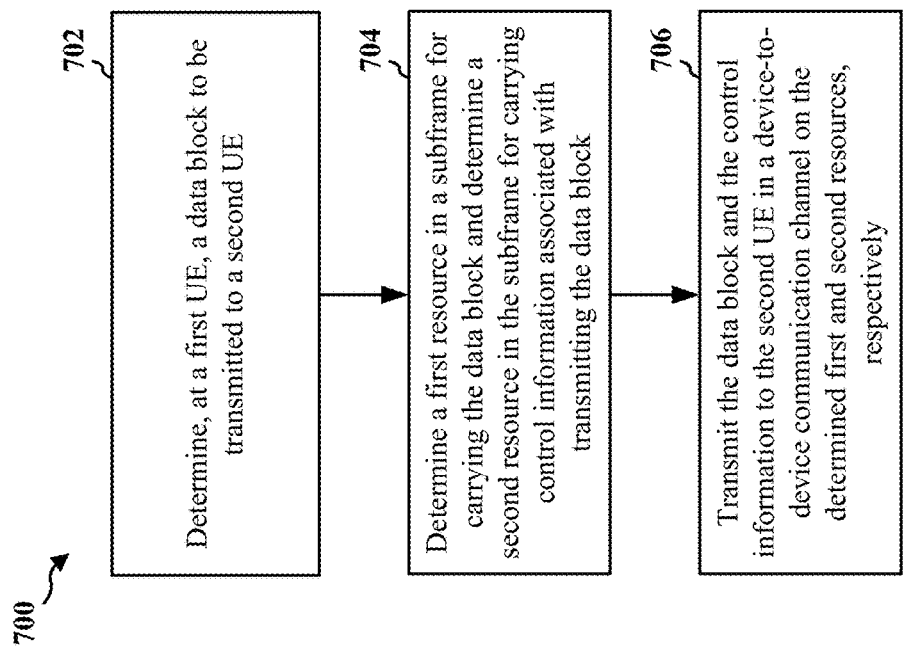
FIG. 7 is a flowchart of a method of wireless communication.

FIG. 7 is a flowchart 700 of a method of wireless communication. The method may be performed by a sender UE (e.g., the UE 502, or the apparatus 902/902') in a device-to-device communication. In one configuration, the method may be performed when the sender UE starts the device-to-device communication with a receiver UE (e.g., the UE 504). The sender UE may be a first UE and the receiver UE may be a second UE. At 702, the first UE determines a data block to be transmitted to the second UE. The data block may be generated by the first UE, or may be received from another device.

At 704, the first UE determines a first resource in a subframe for carrying the data block and determines a second resource in the subframe for carrying control information associated with transmitting the data block. In one configuration, the first resource may be the resource block 512 described above with reference to FIG. 5 or the resource blocks 610, 612, and 614 described above with reference to FIG. 6. In such configuration, the second resource may be the resource block 513 described above with reference to FIG. 5 or the resource elements 622 of the control symbol 620 described above with reference to FIG. 6.

In one configuration, the second resource may include at least a portion of a fixed control symbol within the subframe. In one configuration, no data may be multiplexed within the control symbol. In one configuration, the control symbol may include several resource elements. The second resource may include a fixed number of resource elements from the several resource elements.

In one configuration, the control information may include an allocation of the first resource. In one configuration, the allocation of the first resource may include the size of the first resource and the start of the first resource. In another configuration, the allocation of the first resource may include the size of the first resource, and the start of the first resource can be determined based on the start of the control symbol or the size of the first resource.

In one configuration, the control symbol may be adjacent to a DM-RS symbol. The DM-RS symbol may use a fixed reference signal that has fixed base sequence, cyclic shift, and OCC. In one configuration, a DM-RS symbol not adjacent to the control symbol may use a reference signal with parameters dependent on the control information. In one configuration, the control information may include one or more of: the number of transmissions of the data block, an RVID of current data transmission, the MCS of the data block, the TRPT, or frequency information of subsequent re-transmissions. In one configuration, the control information may include an incremental scheduling of a next re-transmission of the data block instead of the TRPT. In one configuration, the control information may be present only in a first transmission of the data block, and subsequent re-transmissions of the data block may not carry the control information.

Finally, at 706, the first UE transmits the data block and the control information to the second UE in a device-to-device communication channel on the determined first and second resources, respectively. For example, the UE 502 may transmit data and control information to the UE 504 in the device-to-device communication channel 510 on resource blocks 512 and 513, respectively.

In one configuration, the data block and the control information are transmitted to the second UE through a vehicle communication broadcast message. In one configuration, the device-to-device communication channel employs an LTE Direct protocol.

Figure 8:
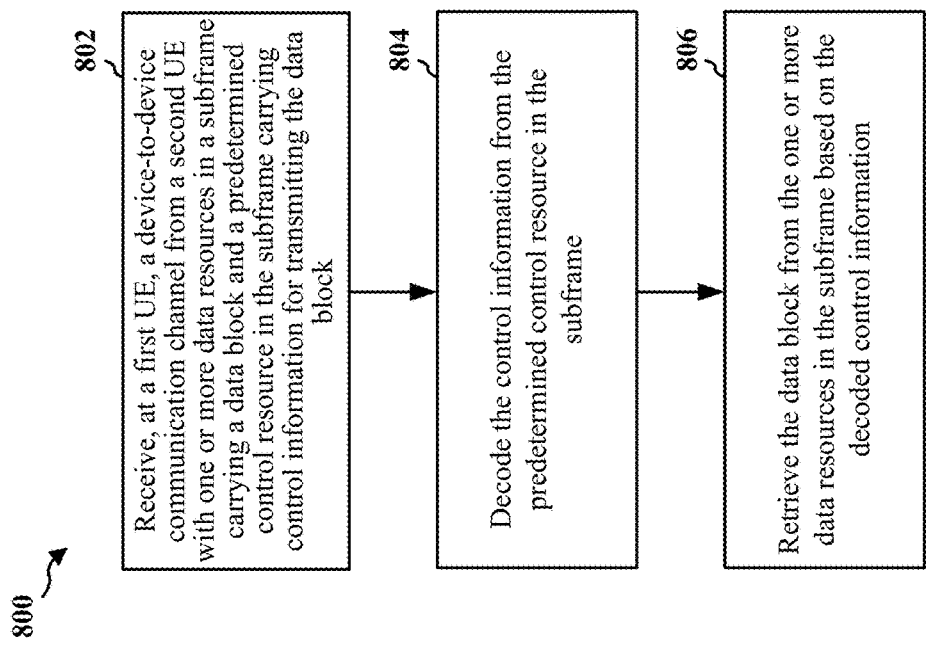
FIG. 8 is a flowchart of a method of wireless communication.

FIG. 8 is a flowchart 800 of a method of wireless communication. The method may be performed by a receiver UE (e.g., the UE 504, 506, or the apparatus 902/902') in a device-to-device communication. In one configuration, the method may be performed when the receiver UE receives the device-to-device communication from a sender UE (e.g., the UE 502). The receiver UE may be a first UE and the sender UE may be a second UE.

At 802, the first UE receives a device-to-device communication channel from a second UE with one or more data resources in a subframe carrying a data block and a predetermined control resource in the subframe carrying control information for transmitting the data block. In one configuration, the device-to-device communication channel may be the device-to-device communication channel 510 described above with reference to FIG. 5. In one configuration, the one or more data resources may be the resource block 512 described above with reference to FIG. 5 or the resource blocks 610, 612, and 614 described above with reference to FIG. 6. In that configuration, the predetermined control resource may be the resource block 513 described above with reference to FIG. 5 or the resource elements 622 of the control symbol 620 described above with reference to FIG. 6.

In one configuration, the data block and the control information may be received through a vehicle communication broadcast message. In one configuration, the device-to-device communication channel may employ an LTE Direct protocol.

In one configuration, the predetermined control resource may include at least a portion of a fixed control symbol within the subframe. To decode the control information, the first UE may retrieve the control information from the fixed control symbol. In one configuration, the control symbol may include several resource elements, and the predetermined control resource may include a fixed number of resource elements from the several resource elements. In one configuration, the control information may include an allocation of the one or more data resources that carry the data block. In one configuration, the allocation may include the size and start of the one or more data resources. In another configuration, the allocation may include the size of the one or more data resources, and the start of the one or more data resources may be determined based on the start of the control symbol or the size of the one or more data resources.

In one configuration, the control symbol may be adjacent to a DM-RS symbol. In one configuration, the DM-RS symbol may use a fixed reference signal that has fixed base sequence, cyclic shift, and OCC. In one configuration, a DM-RS symbol not adjacent to the control symbol may use a reference signal with parameters dependent on the control information.

In one configuration, the control information may include one or more of: the number of transmissions of the data block, a RVID of current data transmission, the MCS of the data block, the TRPT, or frequency information of subsequent re-transmissions. In one configuration, the control information may include an incremental scheduling of a next re-transmission of the data block instead of the TRPT.

At 804, the first UE decodes the control information from the predetermined control resource in the subframe. For example, the UE 504 may retrieve and decode control information from the resource block 513 in subframe 530. In order to decode control information, the first UE may identify different groups of bits carried by the predetermined control resource and translate each group of bits into a parameter related to resource allocation for data transmission. For example, the parameter may be start location and/or size of data resource blocks.

Finally, at 806, the first UE retrieves the data block from the one or more data resources in the subframe based on the decoded control information. For example, the UE 504 may retrieve data from the resource block 512 in subframe 530 based on the decoded control information (e.g., start location and size of resource block 512).

Figure 9:
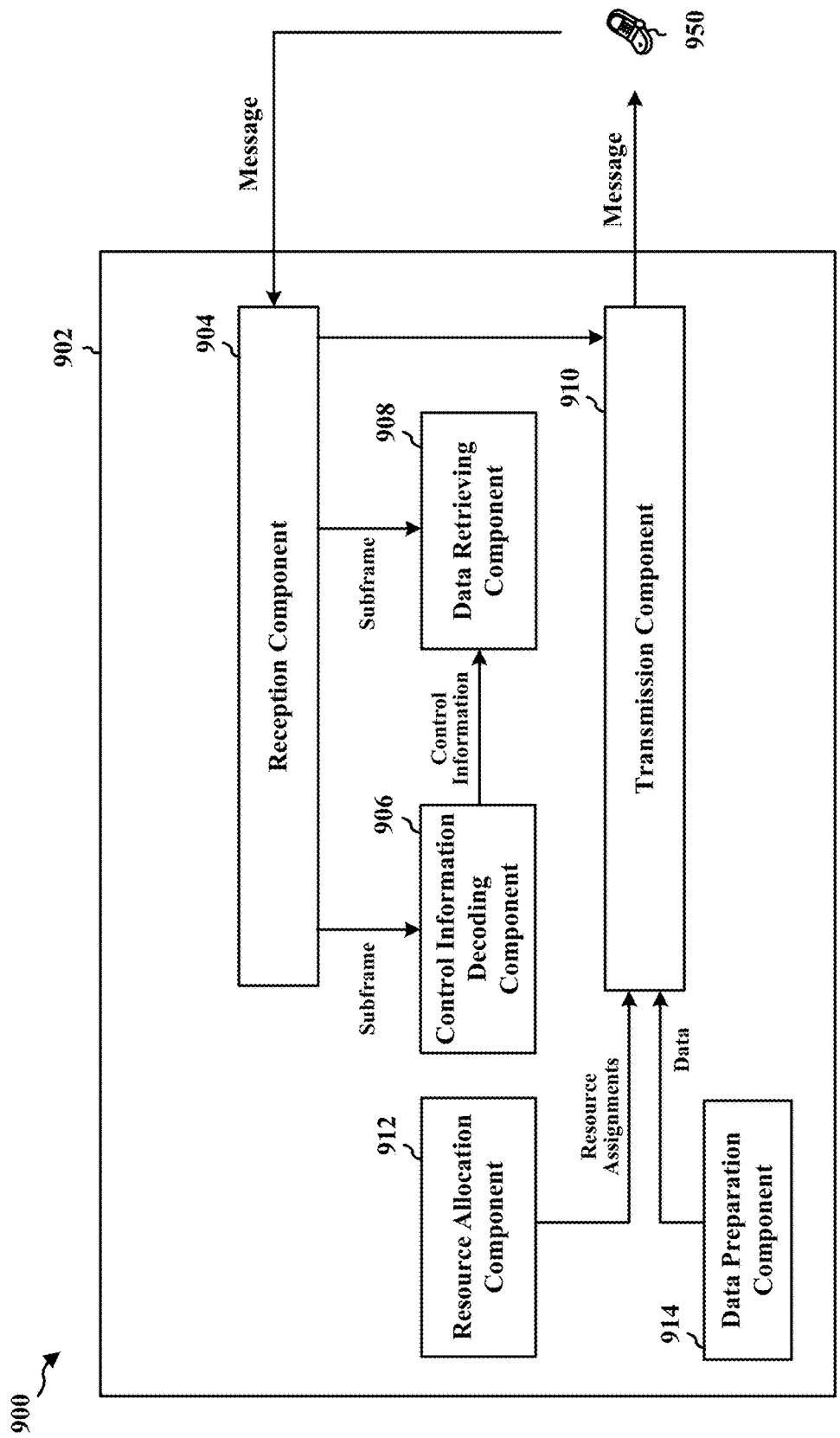
FIG. 9 is a conceptual data flow diagram illustrating the data flow between different means/components in an exemplary apparatus.

FIG. 9 is a conceptual data flow diagram 900 illustrating the data flow between different modules/means/components in an exemplary apparatus 902. The apparatus 902 may be a UE. The apparatus 902 includes a reception component 904 that receives device-to-device communication messages from another UE 950. In one configuration, the reception component 904 performs operations described above at 802 of FIG. 8. The apparatus 902 also includes a transmission component 910 that transmits device-to-device communication messages to the UE 950. In one configuration, the transmission component 910 performs operations described above at 706 of FIG. 7. In one configuration, the device-to-device communication messages may be vehicle communication broadcast messages. The reception component 904 and the transmission component 910 coordinate the communications of the apparatus 902.

The apparatus 902 includes a data preparation component 914 that determines the data to be transmitted to the UE 950. The data prepared by the data preparation component 914 is sent to the transmission component 910. In one configuration, the data preparation component 914 performs operations described above at 702 of FIG. 7.

The apparatus 902 includes a resource allocation component 912 that assigns resources for transmitting data and control information. The resource assignments determined by the resource allocation component 912 are sent to the transmission component 910. In one configuration, the resource allocation component 912 performs operations described above at 704 of FIG. 7. The transmission component 910 transmits the data prepared by the data preparation component 914 to the UE 950 based on the resource assignments determined by the resource allocation component 912.

The apparatus 902 includes a control information decoding component 906 that retrieves and decodes control information from a fixed control symbol in a subframe provided by the reception component 904. The decoded control information is sent to a data retrieving component 908. In one configuration, the control information decoding component 906 performs operations described above at 804 of FIG. 8. The data retrieving component 908 retrieves data from resources in a subframe based on the control information provided by the control information decoding component 906. In one configuration, the data retrieving component 908 performs operations described above at 806 of FIG. 8.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
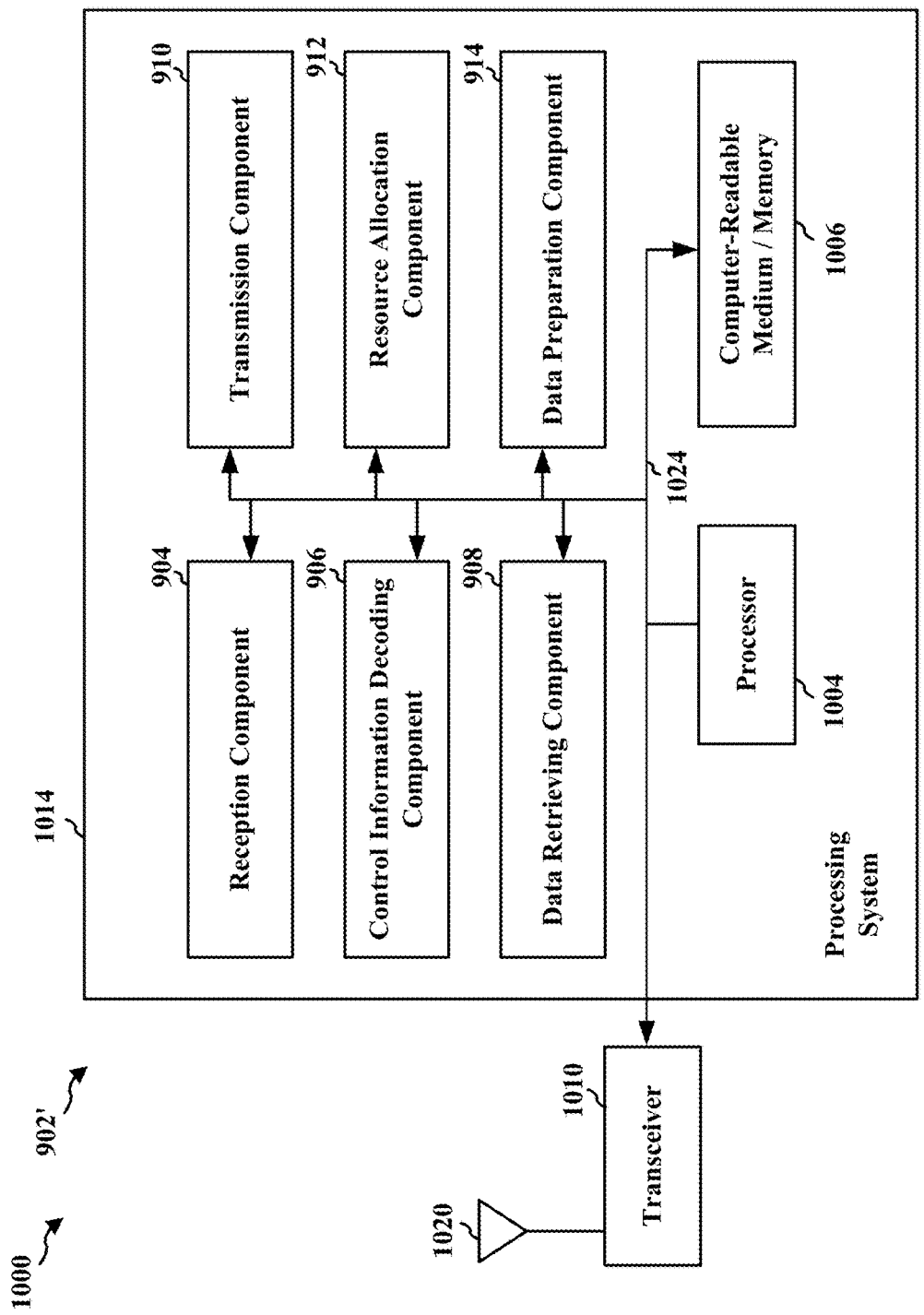
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the components 904, 906, 908, 910, 912, and 914. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for determining a data block to be transmitted to another UE. In one configuration, the means for determining a data block may perform operations described above with reference to 702 of FIG. 7. In one configuration, the means for determining a data block may be the data preparation component 914 or the processor 1004.

The apparatus 902/902' may include means for determining a first resource in a subframe for carrying the data block and a second resource in the subframe for carrying control information associated with transmitting the data block. In one configuration, the means for determining the first and second resources may perform operations described above with reference to 704 of FIG. 7. In one configuration, the means for determining the first and second resources may be the resource allocation component 912 or the processor 1004.

The apparatus 902/902' may further include means for transmitting the data block and the control information to another UE in a device-to-device communication channel on the determined first and second resources, respectively. In one configuration, the means for transmitting may perform operations described above with reference to 706 of FIG. 7. In one configuration, the means for transmitting may be the one or more antennas 1020, the transceiver 1010, the transmission component 910, or the processor 1004.

In one configuration, the apparatus 902/902' for wireless communication includes means for receiving a device-to-device communication channel from another UE with one or more data resources in a subframe carrying a data block and a predetermined control resource in the subframe carrying control information for transmitting the data block. In one configuration, the means for receiving may perform operations described above with reference to 802 of FIG. 8. In one configuration, the means for receiving may be the one or more antennas 1020, the transceiver 1010, the reception component 904, or the processor 1004.

The apparatus 902/902' may include means for decoding the control information from the predetermined control resource in the subframe. In one configuration, the means for decoding may be configured to retrieve the control information from the predetermined control resource in the subframe. In one configuration, the means for decoding may perform operations described above with reference to 804 of FIG. 8. In one configuration, the means for decoding may be the control information decoding component 906 or the processor 1004.

The apparatus 902/902' may further include means for retrieving the data block from the one or more data resources in the subframe based on the decoded control information. In one configuration, the means for retrieving may perform operations described above with reference to 806 of FIG. 8. In one configuration, the means for retrieving may be the data retrieving component 908 or the processor 1004.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first user equipment (UE), comprising:
   determining a data block to be transmitted from the first UE to a second UE;
   determining a first resource in a subframe for carrying the data block and a second resource in the same subframe for carrying control information associated with transmitting the data block, the second resource comprising at least a portion of a fixed control symbol adjacent to a demodulation reference signal (DM-RS) symbol within the subframe, the control information indicating an allocation of the first resource for carrying the data block from the first UE to the second UE; and
   transmitting the data block and the control information to the second UE in a device-to-device communication channel on the determined first and second resources in the same subframe, respectively.

2. The method of claim 1, wherein the data block and the control information are transmitted to the second UE through a vehicle communication broadcast message.

3. The method of claim 1, wherein the device-to-device communication channel employs a Long Term Evolution (LTE) direct protocol.

4. The method of claim 1, wherein no data is multiplexed within the control symbol.

5. The method of claim 4, wherein the control symbol comprises a plurality of resource elements, wherein the second resource comprises a fixed number of resource elements from the plurality of resource elements.

6. The method of claim 1, wherein the DM-RS symbol uses a fixed reference signal that has fixed base sequence, cyclic shift, and orthogonal cover code (OCC).

7. The method of claim 1, wherein a DM-RS symbol not adjacent to the control symbol uses a reference signal with parameters dependent on the control information.

8. The method of claim 1, wherein the control information comprises one or more of a number of transmissions of the data block, a redundancy version identifier (RVID) of current data transmission, a modulation and coding scheme (MCS) of the data block, a time resource pattern of transmission (TRPT), or frequency information of subsequent re-transmissions.

9. The method of claim 1, wherein the control information is present only in a first transmission of the data block and subsequent re-transmissions of the data block do not carry the control information.

10. An apparatus for wireless communication, the apparatus being a first user equipment (UE), comprising:
 means for determining a data block to be transmitted from the first UE to a second UE;
 means for determining a first resource in a subframe for carrying the data block and a second resource in the same subframe for carrying control information associated with transmitting the data block, the second resource comprising at least a portion of a fixed control symbol adjacent to a demodulation reference signal (DM-RS) symbol within the subframe, the control information indicating an allocation of the first resource for carrying the data block from the first UE to the second UE; and
 means for transmitting the data block and the control information to the second UE in a device-to-device communication channel on the determined first and second resources in the same subframe, respectively.

11. The apparatus of claim 10, wherein no data is multiplexed within the control symbol.

12. The apparatus of claim 11, wherein the control symbol comprises a plurality of resource elements, wherein the second resource comprises a fixed number of resource elements from the plurality of resource elements.

13. The apparatus of claim 10, wherein the DM-RS symbol uses a fixed reference signal that has fixed base sequence, cyclic shift, and orthogonal cover code (OCC).

14. The apparatus of claim 10, wherein a DM-RS symbol not adjacent to the control symbol uses a reference signal with parameters dependent on the control information.

15. The apparatus of claim 10, wherein the control information comprises one or more of a number of transmissions of the data block, a redundancy version identifier (RVID) of current data transmission, a modulation and coding scheme (MCS) of the data block, a time resource pattern of transmission (TRPT), or frequency information of subsequent re-transmissions.

16. The apparatus of claim 10, wherein the control information is present only in a first transmission of the data block and subsequent re-transmissions of the data block do not carry the control information.

17. An apparatus for wireless communication, the apparatus being a first user equipment (UE), comprising:
 a memory; and
 at least one processor coupled to the memory and configured to:
  determine a data block to be transmitted from the first UE to a second UE;
  determine a first resource in a subframe for carrying the data block and a second resource in the same subframe for carrying control information associated with transmitting the data block, the second resource comprising at least a portion of a fixed control symbol adjacent to a demodulation reference signal (DM-RS) symbol within the subframe, the control information indicating an allocation of the first resource for carrying the data block from the first UE to the second UE; and
  transmit the data block and the control information to the second UE in a device-to-device communication channel on the determined first and second resources in the same subframe, respectively.

18. The apparatus of claim 17, wherein no data is multiplexed within the control symbol.

19. The apparatus of claim 18, wherein the control symbol comprises a plurality of resource elements, wherein the second resource comprises a fixed number of resource elements from the plurality of resource elements.

20. The apparatus of claim 17, wherein the DM-RS symbol uses a fixed reference signal that has fixed base sequence, cyclic shift, and orthogonal cover code (OCC).

21. The apparatus of claim 17, wherein a DM-RS symbol not adjacent to the control symbol uses a reference signal with parameters dependent on the control information.

22. The apparatus of claim 17, wherein the control information comprises one or more of a number of transmissions of the data block, a redundancy version identifier (RVID) of current data transmission, a modulation and coding scheme (MCS) of the data block, a time resource pattern of transmission (TRPT), or frequency information of subsequent re-transmissions.

23. The apparatus of claim 17, wherein the control information is present only in a first transmission of the data block and subsequent re-transmissions of the data block do not carry the control information.

24. A non-transitory computer-readable medium storing computer executable code for wireless communication, comprising code for:
 determining, at a first user equipment (UE), a data block to be transmitted from the first UE to a second UE;
 determining a first resource in a subframe for carrying the data block and a second resource in the same subframe for carrying control information associated with transmitting the data block, the second resource comprising at least a portion of a fixed control symbol adjacent to a demodulation reference signal (DM-RS) symbol within the subframe, the control information indicating an allocation of the first resource for carrying the data block from the first UE to the second UE; and
 transmitting the data block and the control information to the second UE in a device-to-device communication channel on the determined first and second resources in the same subframe, respectively.

* * * * *